(12) United States Patent
Taniguchi et al.

(10) Patent No.: US 8,175,401 B2
(45) Date of Patent: May 8, 2012

(54) IMAGE PROCESSING APPARATUS AND COMPUTER READABLE MEDIUM STORING PROGRAM THEREFOR

(75) Inventors: Tomoki Taniguchi, Kanagawa (JP); Taro Yokose, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1210 days.

(21) Appl. No.: 11/984,188

(22) Filed: Nov. 14, 2007

(65) Prior Publication Data
US 2008/0298698 A1  Dec. 4, 2008

(30) Foreign Application Priority Data
May 30, 2007  (JP) ................. 2007-143117

(51) Int. Cl.
*G06K 9/36* (2006.01)
*G06K 9/46* (2006.01)

(52) U.S. Cl. ........ 382/245; 382/232; 382/233; 382/239; 382/244

(58) Field of Classification Search ........... 382/232, 382/233, 239, 244, 245
See application file for complete search history.

(56) References Cited

U.S. PATENT DOCUMENTS

| 6,285,458 B1 * | 9/2001 | Yada ................. 358/1.15 |
| 6,674,536 B2 * | 1/2004 | Long et al. ........... 358/1.15 |
| 6,707,463 B1 * | 3/2004 | Gibson et al. .......... 345/619 |

FOREIGN PATENT DOCUMENTS

| JP | A-01-149185  | 6/1989 |
| JP | A-10-215379  | 8/1998 |
| JP | A-2001-086318 | 3/2001 |
| JP | A-2005-12304 | 1/2005 |
| JP | A-2007-074412 | 3/2007 |

OTHER PUBLICATIONS

Notification of Refusal issued in Japanese Patent Application No. 2007-143117 on Aug. 2, 2011. (with English language translation).

* cited by examiner

*Primary Examiner* — Bernard Krasnic
(74) *Attorney, Agent, or Firm* — Oliff & Berridge, PLC (57) ABSTRACT

An image processing apparatus includes an image partitioning unit that partitions an image represented by input image information into image partitions, each containing plural pixels; a run coding unit that run-length encodes image partitions for which all pixels contained in any of the image partitions match with a pixel value in a predetermined position in another image partition; and an independently coding unit that encodes image partitions other than image partitions encoded by the run coding unit, so that the resulting codes are decoded independently for each image partition.

7 Claims, 13 Drawing Sheets

SHIFT PROCESSING (S10)

IMAGE CODING PROGRAM 4

FIG.2B

IMAGE EDITING PROGRAM 5

FIG.3A

CODE DATA

FIG.3B

RUN LENGTH CODE

FIG.3C

SPLITTING RUN LENGTH CODE

FAST-SCANNING DIRECTION

SLOW-SCANNING DIRECTION

IMAGE PARTITION 1 (CODE STRING)
IMAGE PARTITION 2 (CODE STRING)
IMAGE PARTITION 3 (CODE STRING)
IMAGE PARTITION 4 (CODE STRING)

REORDERING IN SLOW-SCANNING DIRECTION

FIG.5B

IMAGE PARTITION 4 (CODE STRING)
IMAGE PARTITION 3 (CODE STRING)
IMAGE PARTITION 2 (CODE STRING)
IMAGE PARTITION 1 (CODE STRING)

FIG.5C

ORDER IN WHICH VALUES ARE BUFFERED

PIXELS CONTAINED IN IMAGE PARTITION

LINE BUFFER

| 1 | 2 | 3 | 4 | 5 |

ORDER IN WHICH VALUES ARE READ

REORDERING IN FAST-SCANNING DIRECTION

FIG.5D

| 5 | 4 | 3 | 2 | 1 |

BLOCK WITH SIZE OF 4 × 2 PIXELS

FIG.7B

BLOCK LINE BUFFER

FIG.7C

PIXEL-LEVEL REORDERING

SPLITTING RUN LENGTH CODE

FIG.9B

SHIFT AT PARTITION LEVEL

FIG.9C

SHIFT AT PIXEL LEVEL

FIG.9D

MARGIN PIXEL INSERTED

FIG.10

SHIFT PROCESSING (S10)

SPLIT RUN LENGTH CODE

PARTITION-LEVEL MERGING

PIXEL-LEVEL MERGING

MERGE PROCESSING (S20)

IMAGE PROCESSING APPARATUS AND COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2007-143117 filed May 30, 2007.

BACKGROUND

Technical Field

The present invention relates to an image processing apparatus and a computer readable medium storing a program therefor.

SUMMARY

According to an aspect of the invention, an image processing apparatus includes an image partitioning unit that partitions an image represented by input image information into image partitions, each containing plural pixels; a run coding unit that run-length encodes image partitions for which all pixels contained in any of the image partitions match with a pixel value in a predetermined position in another image partition; and an independently coding unit that encodes image partitions other than image partitions encoded by the run coding unit, so that the resulting codes are decoded independently for each image partition.

BRIEF DESCRIPTION OF THE DRAWINGS

An exemplary embodiment of the present invention and its modification examples will be described in detail based on the following figures, wherein.

DETAILED DESCRIPTION

An overview of an image forming system is described for an exemplary embodiment of the present invention.

Figure 1:
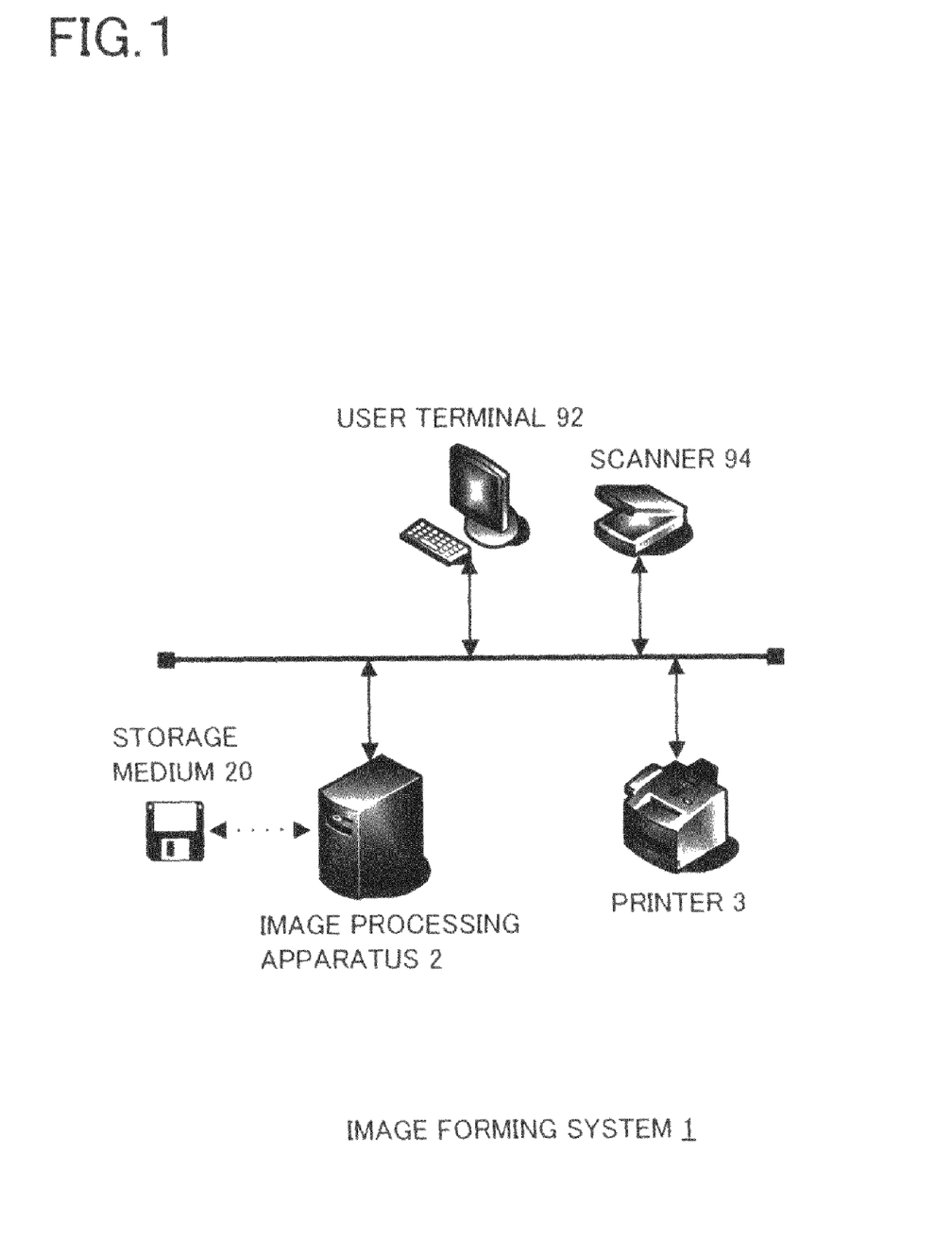
FIG. 1 illustrates an overview of an image forming system.

FIG. 1 illustrates an overview of the image forming system.

As illustrated in FIG. 1, the image forming system 1 includes an image processing apparatus 2 and a printer 3.

The image processing apparatus 2 is a computer. The image processing apparatus 2 in this example is connected to a network such as LAN. The image processing apparatus 2 performs image processing on image information received from a user terminal 92 or a scanner 94 and sends the processed image information to the printer 3. An example of image processing discussed in this exemplary embodiment is rotating an image input to the processing apparatus (input image) by 90 or 180 degrees.

The printer 3 is an example of an image forming apparatus. The printer 3 in this example receives image information from the image processing apparatus 2 via the network such as LAN and prints an image on printing paper based on the received image information.

Alternatively, the image processing apparatus 2 may be provided within the housing of the printer 3.

Figure 2A:
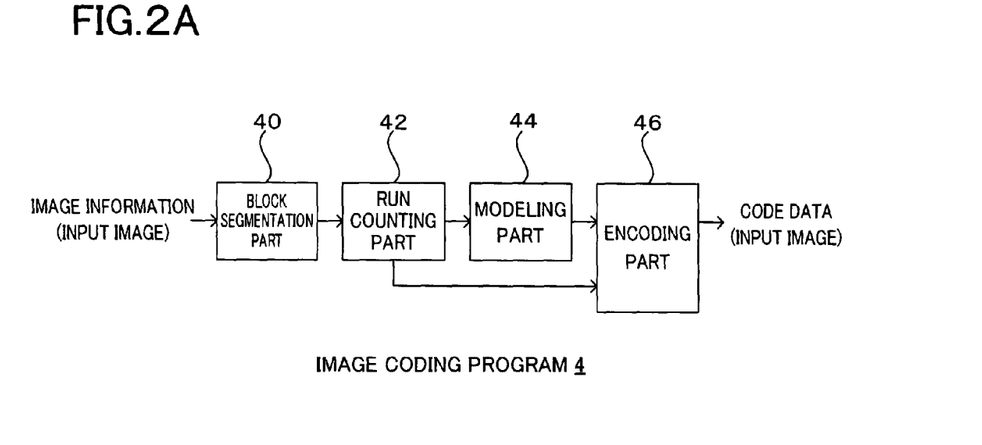
FIG. 2A illustrates an arrangement of functions of an image coding program 4 (embodied in a computer readable medium) which is executed by the image processing apparatus 2 (FIG. 1)
Figure 2B:
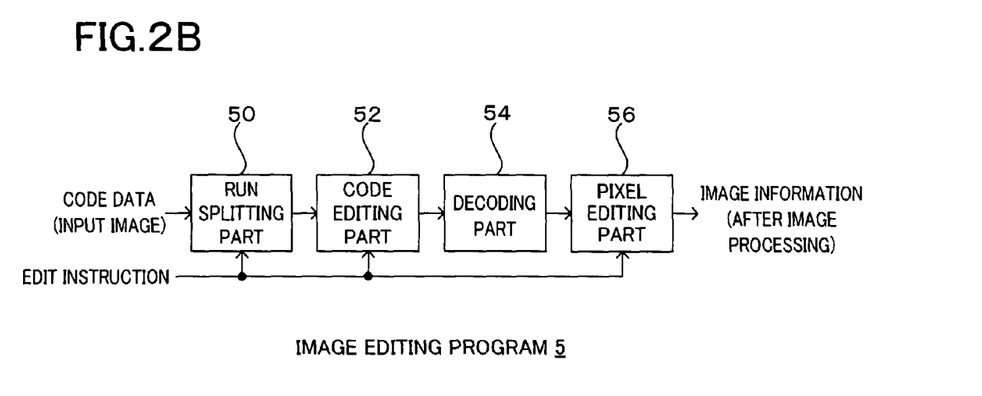
FIG. 2B illustrates an arrangement of functions of an image editing program 5 (embodied in a computer readable medium)

FIG. 2A illustrates an arrangement of functions of an image coding program 4 (embodied in a computer readable medium) which is executed by the image processing apparatus 2 (FIG. 1). FIG. 2B illustrates an arrangement of functions of an image editing program 5 (embodied in a computer readable medium).

As illustrated in FIG. 2A, the image coding program 4 includes a block segmentation part 40, a run counting part 42, a modeling part 44, and an encoding part 46. The image coding program 4 in this example performs coding by SIMD processing.

As illustrated in FIG. 2B, the image editing program 5 includes a run splitting part 50, a code editing part 52, a decoding part 54, and a pixel editing part 56.

Some or all of the functions of the image coding program 4 and the image editing program 5 are, for example, recorded on a storage medium 20 (FIG. 1) and installed into the image processing apparatus 2 from the storage medium 20. Alternatively, the functions of the image processing program 5 may be installed into the image processing apparatus 2 via the network.

In the image coding program 4, the block segmentation part 40 segments an image of input image information into image partitions (blocks), each partition (block) containing plural pixels.

For example, the block segmentation part 40 segments an input image into rectangular image blocks, each made up of N×M pixels.

The run counting part 42 performs processing for run length coding of image partitions (blocks). More specifically, if the values of all pixels contained in an image partition being processed match with a pixel value in a predetermined position in another image partition, the run counting part 42 increments the run count for this image partition and outputs the run count (block count) to the encoding part 46.

The run counting part 42 in this example compares the last pixel value in the preceding block (that is, the pixel value just before the first pixel in the target block) with the values of the pixels contained in the target block. If there are matches between the last pixel value in the preceding block and the values of all pixels in the target block, the run counting part 42 increments the run count.

The modeling part 44 performs modeling for encoding the values of pixels contained in a block using only the values of the pixels within the image partition (block). Any coding method such as, for example, run length coding in which runs are restricted within a block and predictive coding in which reference bounds are limited within a block may be used, provided that encoded values are decoded using only the values of pixels within a block.

The encoding part 46 entropy encodes run length data which has been input from the run counting part 42 or the values of pixels modeled by the modeling part 44.

In the image editing program 5, the run splitting part 50 converts input code data (code data for an image) into code data that are decoded independently in units of image partitions.

For example, when a run length code representing plural image partitions (blocks) is included in the code data, the run splitting part 50 splits this code into run length codes corresponding to each block. When a code for referral to another image partition (block) is included in code data for the target block, the run splitting part 50 embeds the values of the pixels of the block referred to into the target block.

The run splitting part 50 in this example performs run length code splitting, as appropriate for a requested image edit (edit instruction).

The code editing part 52 manipulates encoded image information in units of image partitions. Because the values of plural pixels exist in an image partition, the code editing part 52 manipulates code strings included in code data, wherein each code string corresponds to the values of the plural pixels in a block. In the description of the present exemplary embodiment, a set of codes corresponding to the values of all pixels contained in an image partition is termed a code string and a set of codes corresponding to a whole image is termed code data.

The code editing part 52 in this example performs reordering of, deletion from, addition to, or selection out of code data input from the run splitting part 50, as appropriate for image processing specifics.

The decoding part 54 decodes code data input from the code editing part 52 and outputs decoded image data to the pixel editing part 56. Code data converted by the run splitting part 50 may be decoded independently per image partition and, hence, code strings may be decoded even after reordered.

The pixel editing part 56 manipulates image data decoded by the decoding part 54 in units of pixels.

The pixel editing part 56 in this example performs reordering of, deletion from, addition to, or selection out of decoded values of pixels, as appropriate for image processing specifics (an angle of rotation, shift amount and direction, a merge position).

Figure 3A:
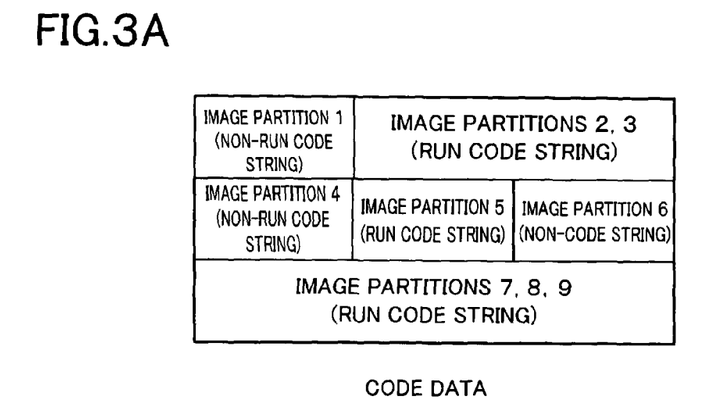
FIGS. 3A to 3C illustrate splitting of run length codes.
Figure 3B:
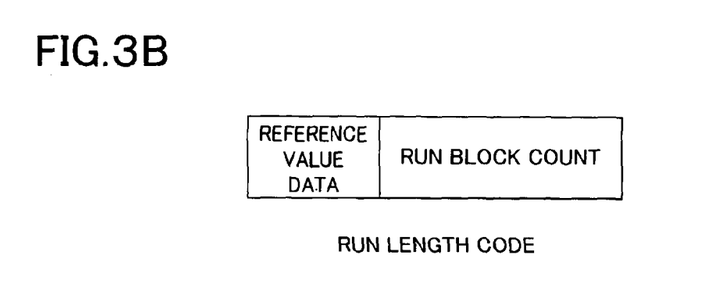
Figure 3C:
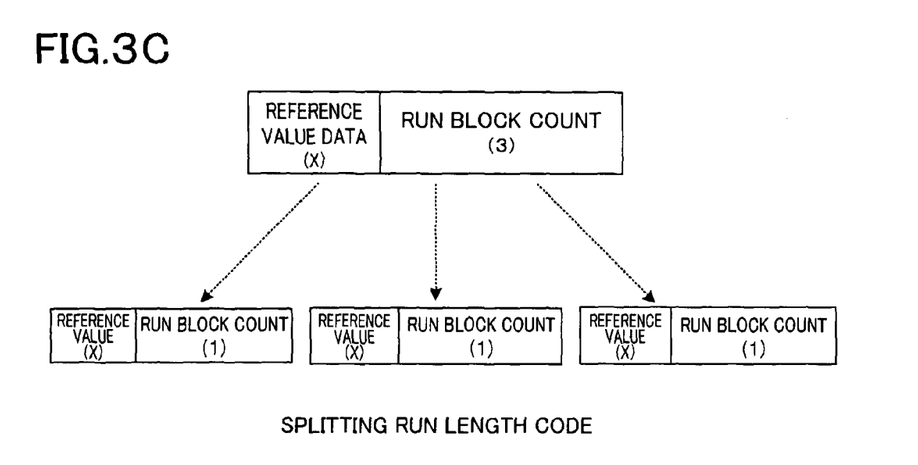

FIGS. 3A to 3C illustrate splitting a run length code.

As illustrated in FIG. 3A, the image coding program 4 in this example generates code data in which code strings (non-run code strings) that are decoded independently per image partition are mixed with run length codes (run code strings), each representing plural image partitions. A run length code, as illustrated in FIG. 3B, includes reference value data and a run block count (run count). The reference value data represents a pixel value with which the relevant image partitions are painted and corresponds to the last pixel value in the preceding block in this example.

Because such a run length code is able to represent the values of many pixels in a short code string, it facilitates data compression at a high ratio, but it may not be decoded per image partition. For example, in order to decode codes in an image partition 3 in FIG. 3A, it is necessary to sequentially decode codes corresponding to the preceding image partition 2 and the codes for the image partition 3.

Thus, the run splitting part 50 (FIG. 2) in this example splits a run length code representing plural blocks into run length codes for each block, as appropriate for edit specifics instructed, as illustrated in FIG. 3C. In this example, because the run block count is 3, three run length codes, each having the run block count of 1, are generated. The reference value data included in each run length code after being split is the same as the reference value data included in the original run length code.

In this way, splitting a run length code in this example not only splits it into individual run length codes, but also involves embedding the pixel value referred to and belonging to another block into the target block.

FIGS. 4A to 4E illustrate processing for rotating the image by 180 degrees.

Figure 4A:
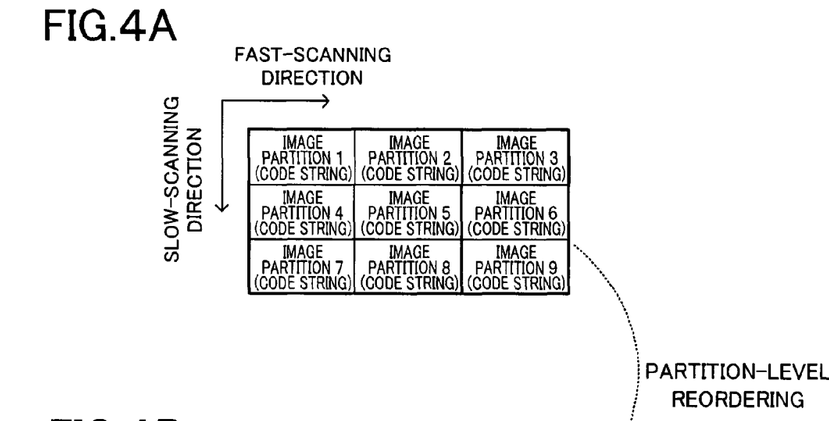
FIGS. 4A to 4D illustrate processing for image rotation by 180 degrees.

When instructed to rotate the image by 180 degree as an edit operation, the run splitting part 50 (FIG. 2) splits all run code strings (FIG. 3A) into individual code strings, all of which correspond to individual image partitions, as illustrated in FIG. 4A.

Figure 4B:
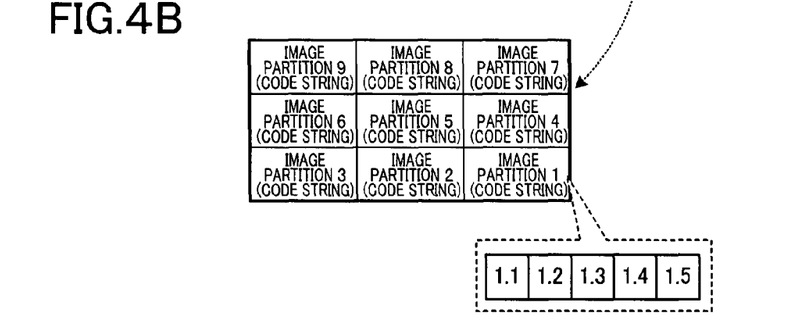

The code editing part 52 (FIG. 2) reorders the image partitions to rotate the image by 180 degrees, as illustrated in FIG. 4B. Thereby, mirroring of the image partitions is performed with respect to both the fast-scanning direction and the slow-scanning direction.

Figure 4C:
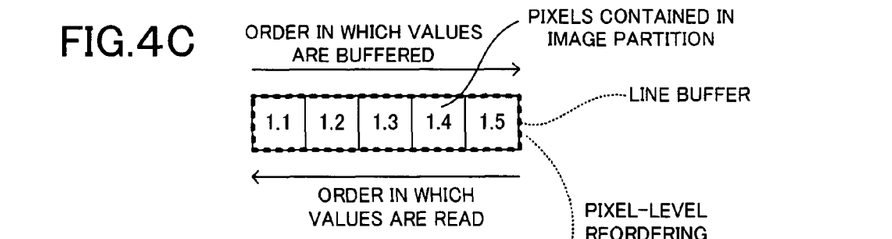

Then, the decoding part 54 decodes the code strings which have been input sequentially from the code editing part 52 and outputs a set of decoded values of pixels to the pixel editing part 56. FIG. 4C illustrates a set of pixels for one image partition, output from the decoding part 54. For illustrative purposes, the processing is explained assuming that one image partition contains five pixels in this example. However, the number of pixels that may be contained in an image partition is not limited to five.

Figure 4D:
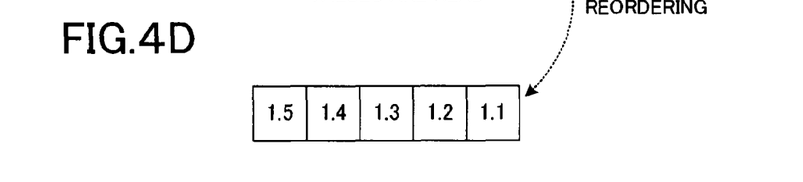

The pixel editing part 56 reorders the values of pixels in an image partition input from the decoding part 54 pixel by pixel in the fast-scanning direction. More specifically, the pixel editing part 56 buffers the values of pixels as many as contained in one image partition (five pixels in this example) input from the decoding part 54 into a line buffer and reads these values from the line buffer in reverse order to the order in which the values have been buffered, as illustrated in FIG. 4C. Thereby, mirroring of the values of the pixels for one line in the fast-scanning direction is accomplished, as illustrated in FIG. 4D.

As described above, processing for image rotation by 180 degrees is carried out by combination of rotation by 180 degrees at the level of image partitions (processing on codes) and rotation by 180 degrees at the level of pixels (processing on the values of pixels).

Figure 5A:
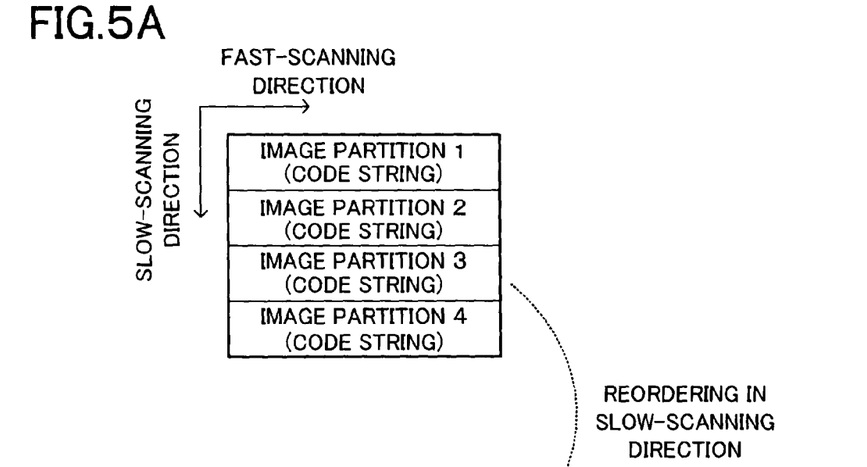
FIGS. 5A to 5D illustrate processing for image rotation by 180 degrees for lines, wherein one fast-scan line is regarded as an image subset.
Figure 5B:
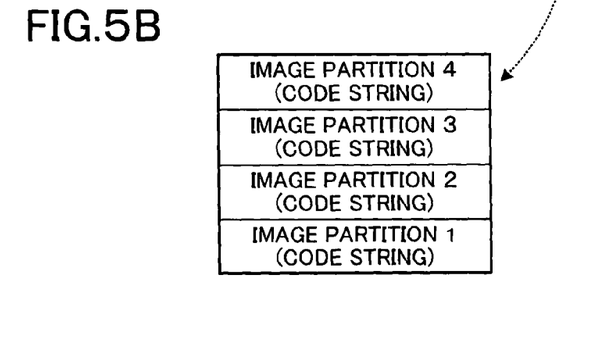
Figure 5C:
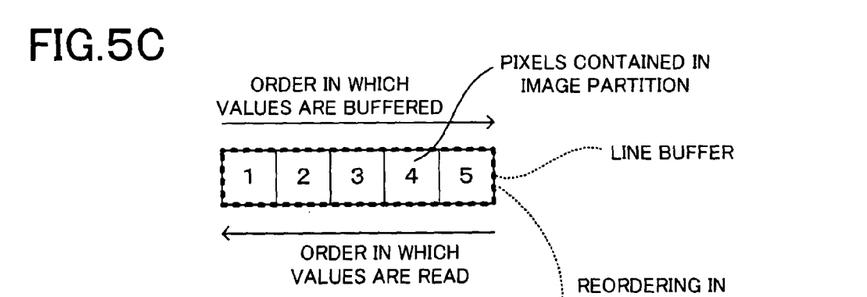
Figure 5D:
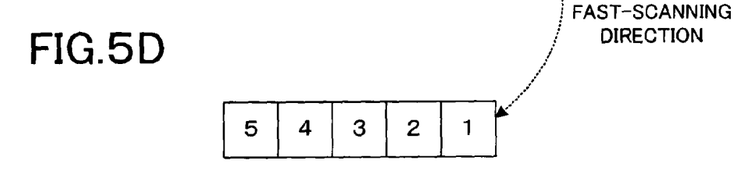

In the above-described example, mirroring of image partitions is performed in both the fast-scanning direction and the slow-scanning direction. Alternatively, one fast-scan line may be assumed as one partition, as is illustrated in FIG. 5A, if a line buffer of sufficient size may be allocated, and mirroring of image partitions only in the slow-scanning direction may be performed, and mirroring of the values of pixels on every fast-scan line may be performed. In this case, there is no need to split a run length code for runs in the fast-scanning direction and, hence, the size of data to be processed in units of image partitions is reduced.

In this example, one fast-scan line is assumed as one image partition and encoded entirely. Alternatively, code strings of image partitions illustrated in FIG. 4A may be assembled per line and mirroring in the slow-scanning direction may be performed for the code strings for one line (for example, the code strings of image partitions 1, 2 and 3 in FIG. 4A).

FIGS. 6A to 6D illustrate processing for image rotation by 90 degrees clockwise.

Figure 6A:
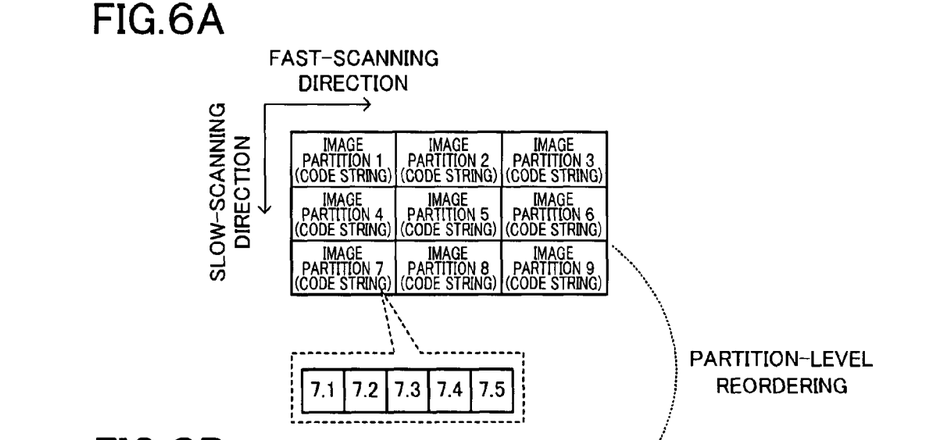
FIGS. 6A to 6D illustrate processing for image rotation by 90 degrees clockwise.

In the case of processing for image rotation by 90 degrees clockwise, the run splitting part 50 splits all run length codes in the fast-scanning direction, as illustrated in FIG. 6A.

Figure 6B:
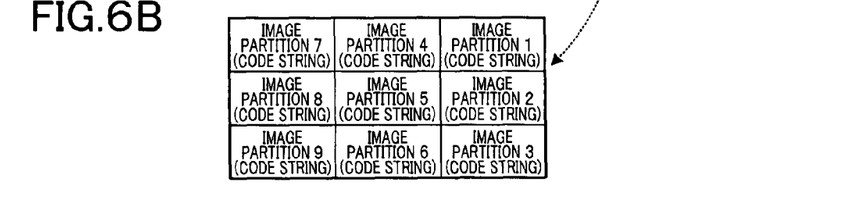

The code editing part 52 reorders the code strings of image partitions to rotate the image by 90 degrees at the image partition level, as illustrated in FIG. 6B.

Specifically, the code editing part 52 carves out the code strings of image partitions from down to up in the slow-scanning direction. After carving out them up to the top image partition (image partition 1), the code editing part 52 shifts by one partition in the fast-scanning direction and again carves out the code strings of image partitions from down to up in the slow-scanning direction. Thereby, the code strings are arrayed as illustrated in FIG. 6B.

Then, the decoding part 54 sequentially decodes the code strings which are input in order from the code editing part 52 and outputs a set of decoded values of pixels to the pixel editing part 56.

Figure 6C:
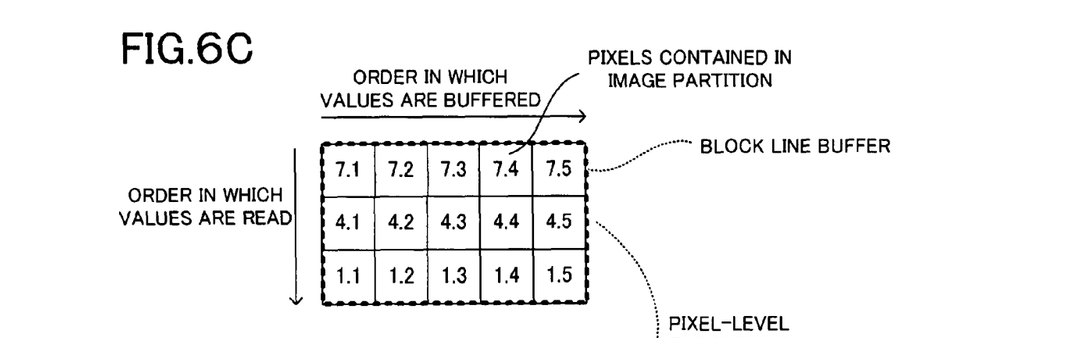

The pixel editing part 56 reorders the values of the pixels in the image partitions input from the decoding part 54 to rotate the values of the pixels in each partition by 90 degrees.

Figure 6D:
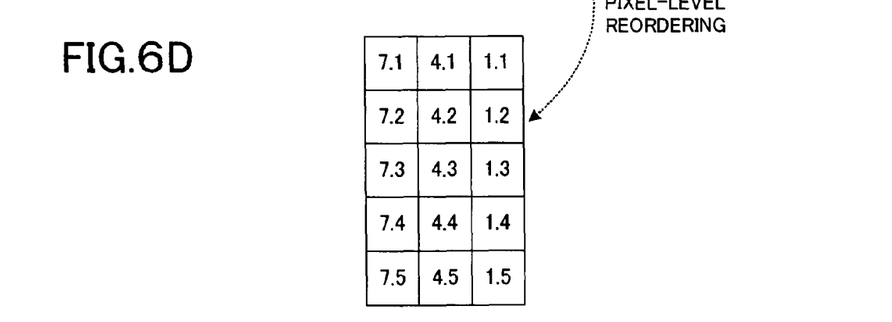

Specifically, the pixel editing part 56 buffers the values of the pixels contained in three image partitions, input from the decoding part 54, into a block line buffer, and reads these values from the line buffer in a direction orthogonal to the direction in which the values have been buffered, as illustrated in FIG. 6C. Thereby, the values of the pixels contained in each image partition are rotated by 90 degrees, as illustrated in FIG. 6D. The block line buffer is a buffer having a storage area for a region smaller than a page buffer for one page image.

As described above, processing for image rotation by 90 degrees is accomplished by combination of rotation by 90 degrees at the level of image partitions (processing on codes) and rotation by 90 degrees at the level of pixels (processing on the values of pixels).

Next, an example of modification to the above-described exemplary embodiment is described.

Figure 7A:
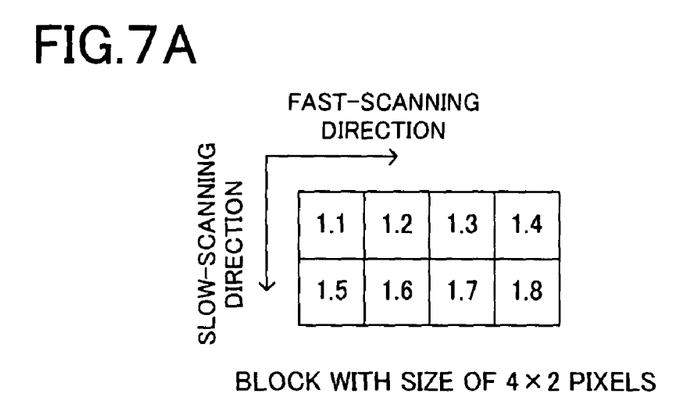
FIGS. 7A to 7C illustrate processing for image rotation by 180 degrees in a case where an image partition is defined as having 4×2 pixels.

In the previously described example, an image partition is defined to have a one-pixel dimension in the slow-scanning direction; however, this is not restrictive. An image partition may be defined to have a two-pixel dimension in the slow-scanning direction, for example, as illustrated in FIG. 7A. In this example, two fast-scan lines are assumed as one partition.

Figure 7B:
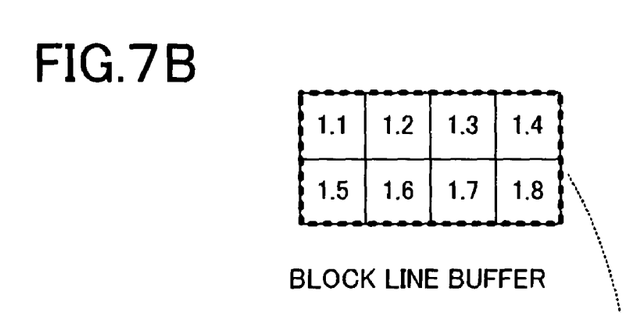
Figure 7C:
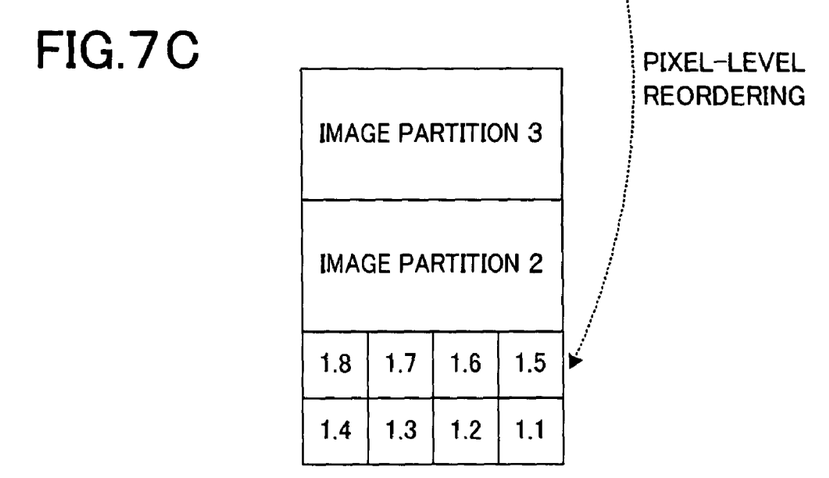

Processing to rotate the image by 180 degrees in this case is such that the code editing part 52 simply reorders these image partitions in the slow-scanning direction in the same way as explained in the foregoing exemplary embodiment. Then, the pixel editing part 56 buffers the values of pixels in an image partition into a block line buffer as illustrated in FIG. 7B and reads these values from the block line buffer in reverse order to the order in which the values have been buffered. Thereby, the values of the pixels in the image partitions are reordered, as illustrated in FIG. 7C, to rotate the image by 180 degrees.

Next, shifting an image is explained.

Figure 8A:
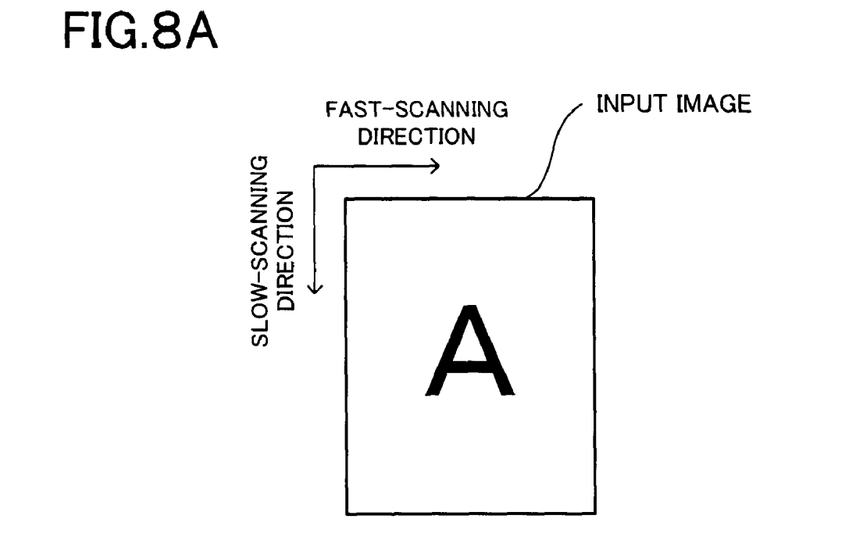
FIGS. 8A and 8B illustrate an outline of shift processing that is performed at an image partition level and at a pixel level.
Figure 8B:
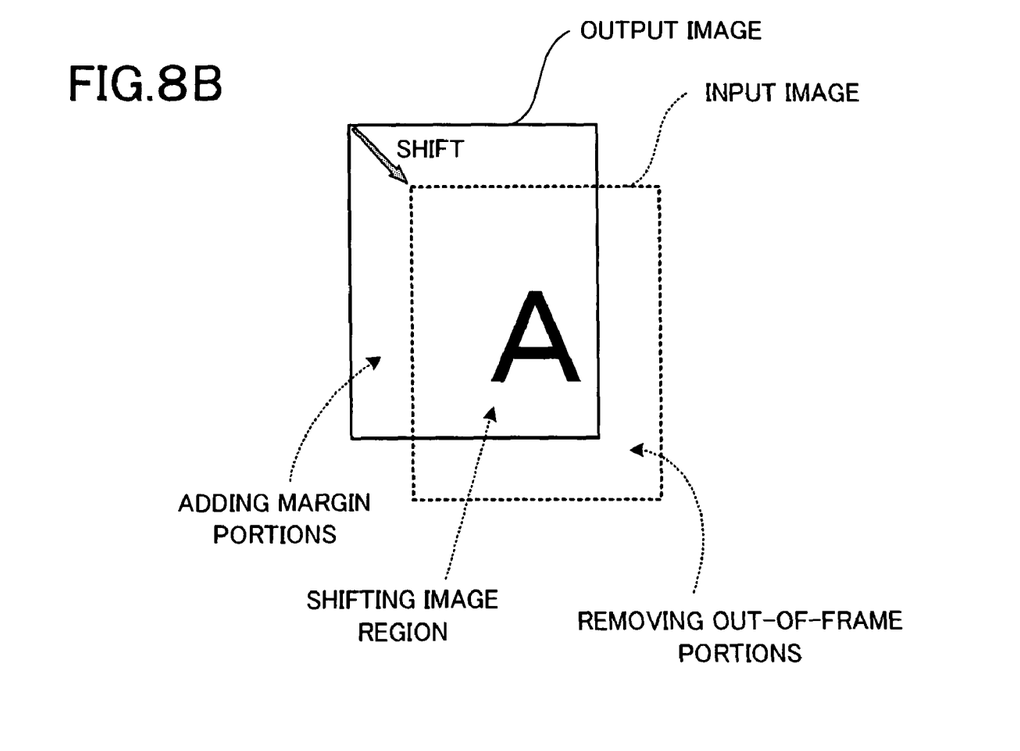

Sometimes, an input image which is illustrated in FIG. 8A may be translated (shifted) and output. This output image is illustrated in FIG. 8B. When such shift processing is performed, it may be needed to add margin portions and remove out-of-frame portions as well as shifting pixels, as illustrated in FIG. 8B.

In this example, processing that is performed at the partition level includes at least one of the following: shifting pixels, adding margin portions, and removing out-of-frame portions. Then, processing such as shifting pixels is performed at the pixel level.

FIGS. 9A to 9D illustrate shift processing. These figures explain processing to shift an image by five pixels in the fast-scanning direction.

Figure 10:
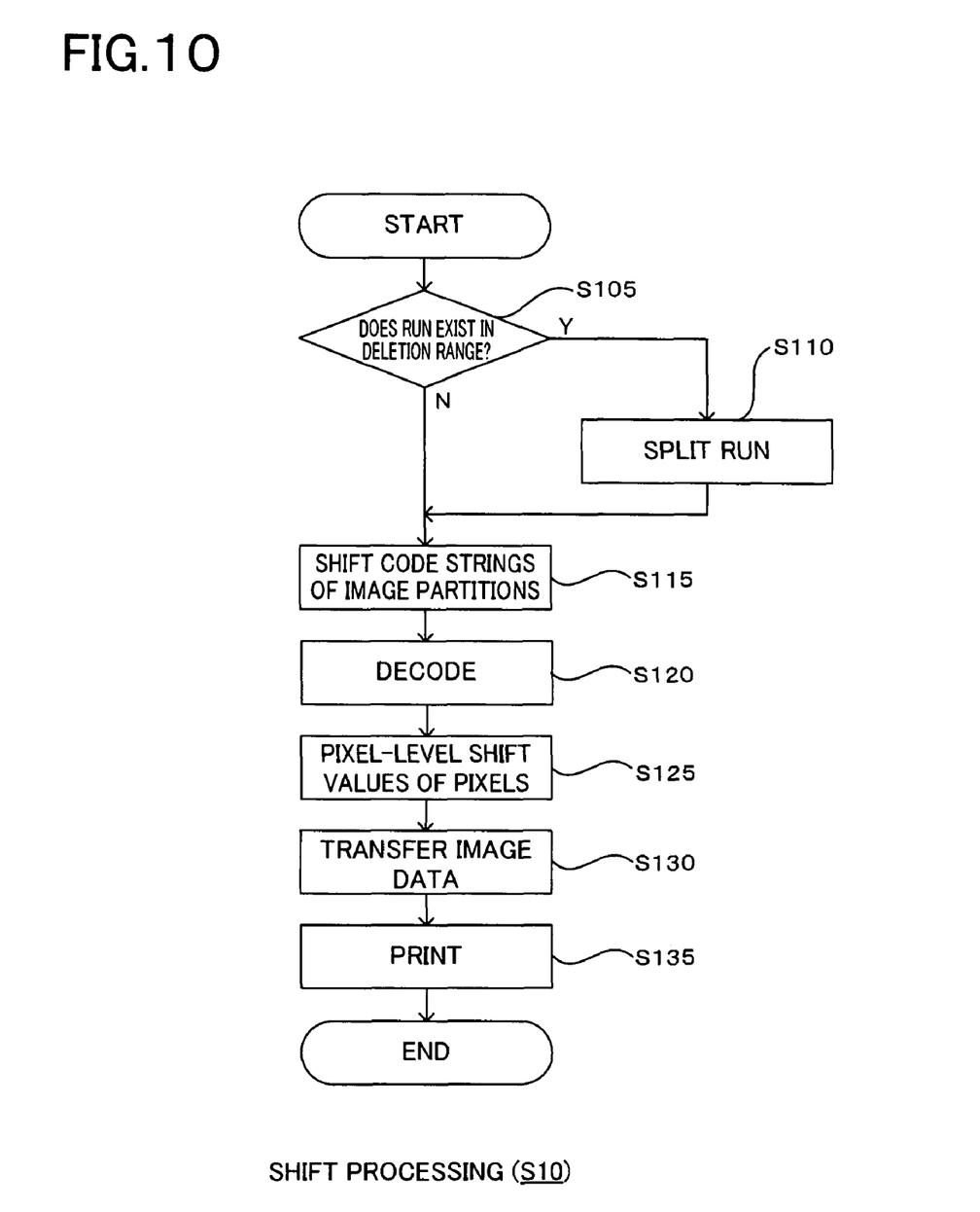
FIG. 10 is a flowchart of shift processing.

FIG. 10 is a flowchart of shift processing (S10).

After determining an image range to be deleted, based on the shift amount and shift direction for requested shift processing, the run splitting part 50 decides whether a part of a run length code (representing plural image partitions) exists within the image range to be deleted at step 105 (S105) in FIG. 10. If a part of a run length code exists within the deletion range, the process goes to step S110. If no run length code exits within the deletion range or if an entire run length code is included within the deletion range, the process goes to step S115.

Figure 9A:
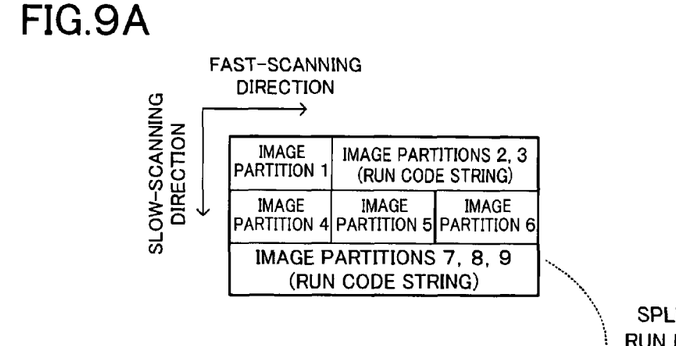
FIGS. 9A to 9D illustrate shift processing in greater detail.
Figure 9B:
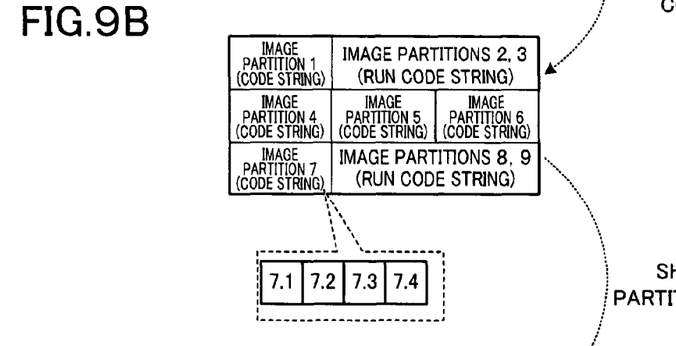

When out-of-frame portions (image portions to be deleted) overlap a part of a run length code, as illustrated in FIG. 9A, the run splitting part 50 splits the run length code as illustrated in FIG. 9B at step 110 (S110). In this figure, because image partitions 1, 4 and 7 are out-of-frame portions, the run length code corresponding to image partitions 7, 8, 9 is split into an image partition 7 and a run length code for image partitions 8, 9. In this example, four pixels are arranged in the fast-scanning direction within one image partition.

Figure 9C:
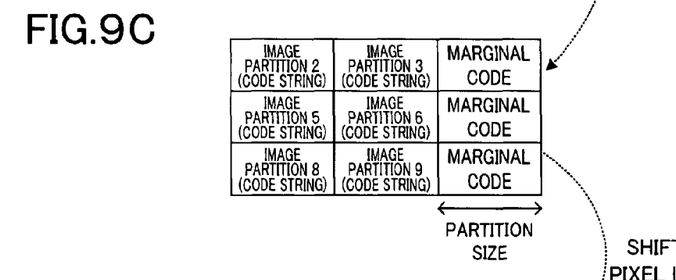

At step 115 (S115), the code editing part 52 shifts the image partitions as illustrated in FIG. 9C. In this example, a shift by five pixels upstream in the fast-scanning direction is requested and, therefore, a one-partition shift and a one-pixel shift are performed. For one-partition shift processing, the first image partition (code string) in the fast-scanning direction is deleted and one marginal code string is added in the last position in the fast-scanning direction. Thereby, the code strings of the image partitions 1, 4, and 7 are deleted as out-of-frame portions and one marginal code string is added on each fast-scan line downstream of the remaining code strings (to the right on the drawing).

At step 120 (S120), the decoding part 54 sequentially decodes the code strings which are input in order from the code editing part 52 and outputs a set of decoded values of pixels to the pixel editing part 56. A marginal code is decoded to values of pixels corresponding to a margin.

At step 125 (S125), the pixel editing part 56 performs a pixel-level shift of the values of pixels input from the decoding part 54 by the remaining amount of shift.

Figure 9D:
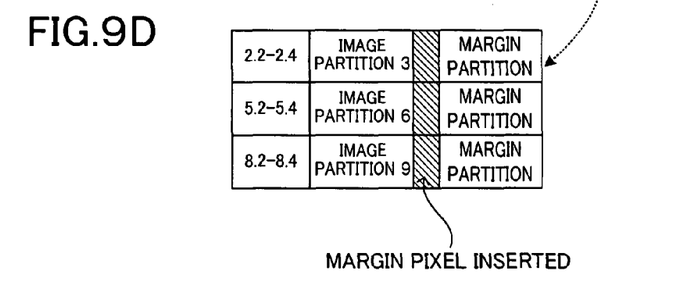

Specifically, for the values of pixels input from the decoding part 54, the pixel editing part 56 cuts the first pixel on each fast-scan line as an out-of-frame pixel and inserts a margin pixel after the last partition on each fast-scan line, as illustrated in FIG. 9D.

As described above, desired shift processing is accomplished by combination of shift processing at the image partition level (processing on codes) and shift processing at the pixel level (processing on pixels).

At step 130 (S130), the image processing apparatus 2 (FIG. 1) transfers the shift-processed image data to the printer 3.

At step 135 (S135), the printer 3 prints an image based on the image data transferred from the image processing apparatus 2.

Next, combining plural input images is explained.

Figure 11A:
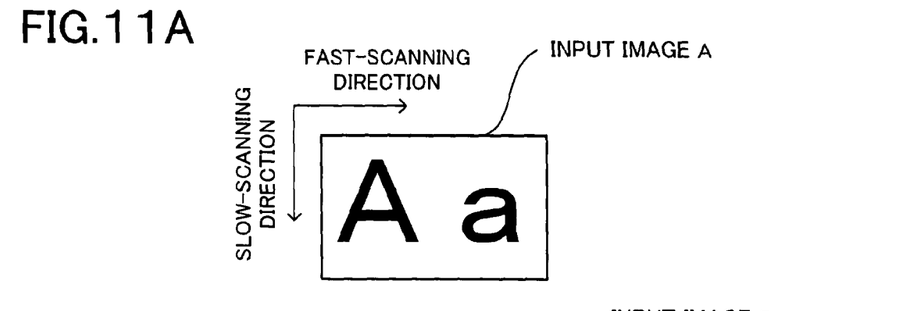
FIGS. 11A to 11D illustrate an outline of combine processing.
Figure 11B:
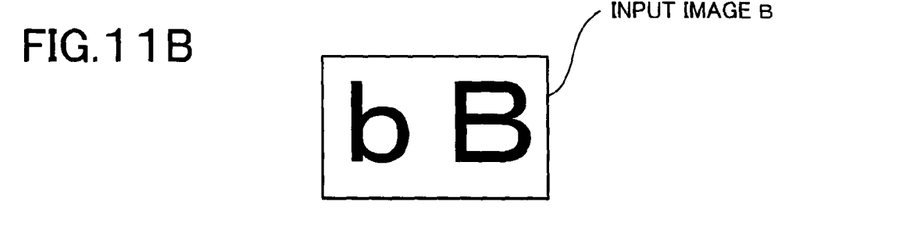
Figure 11C:
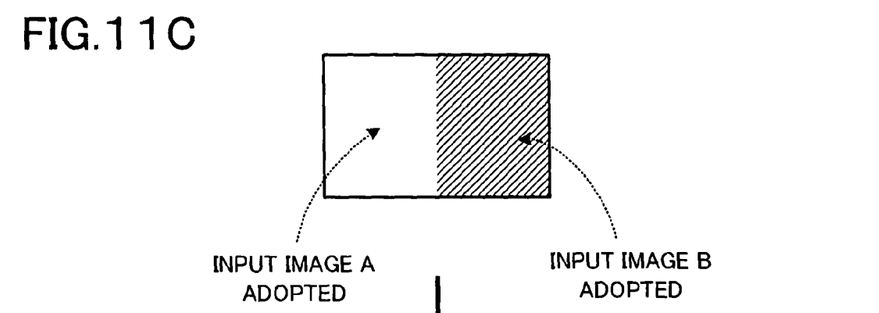
Figure 11D:
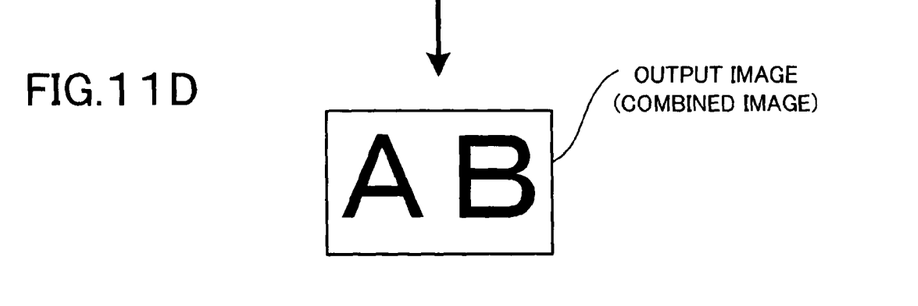

Sometimes, an input image A illustrated in FIG. 11A and an input image illustrated in FIG. 11B may be combined into an output image (combined image) illustrated in FIG. 11D. In this case, tag information which is illustrated in FIG. 11C is used as information to specify how to combine the images.

The tag information in this example is an binary image, one value of which indicates that the input image A is adopted and the other value of which indicates that the input image B is adopted. In other words, the tag information in this example instructs processing to adopt the input image A in the left half of the image and adopt the input image B in the right half of the image.

In the present exemplary embodiment, such combine (merge) processing is accomplished by combination of combine processing at the image partition level and combine processing at the pixel level.

FIGS. 12A to 12E illustrate combine (merge) processing. Although these figures explain processing to merge two input images, processing to merge three or more input images may be performed in a similar fashion.

Figure 13:
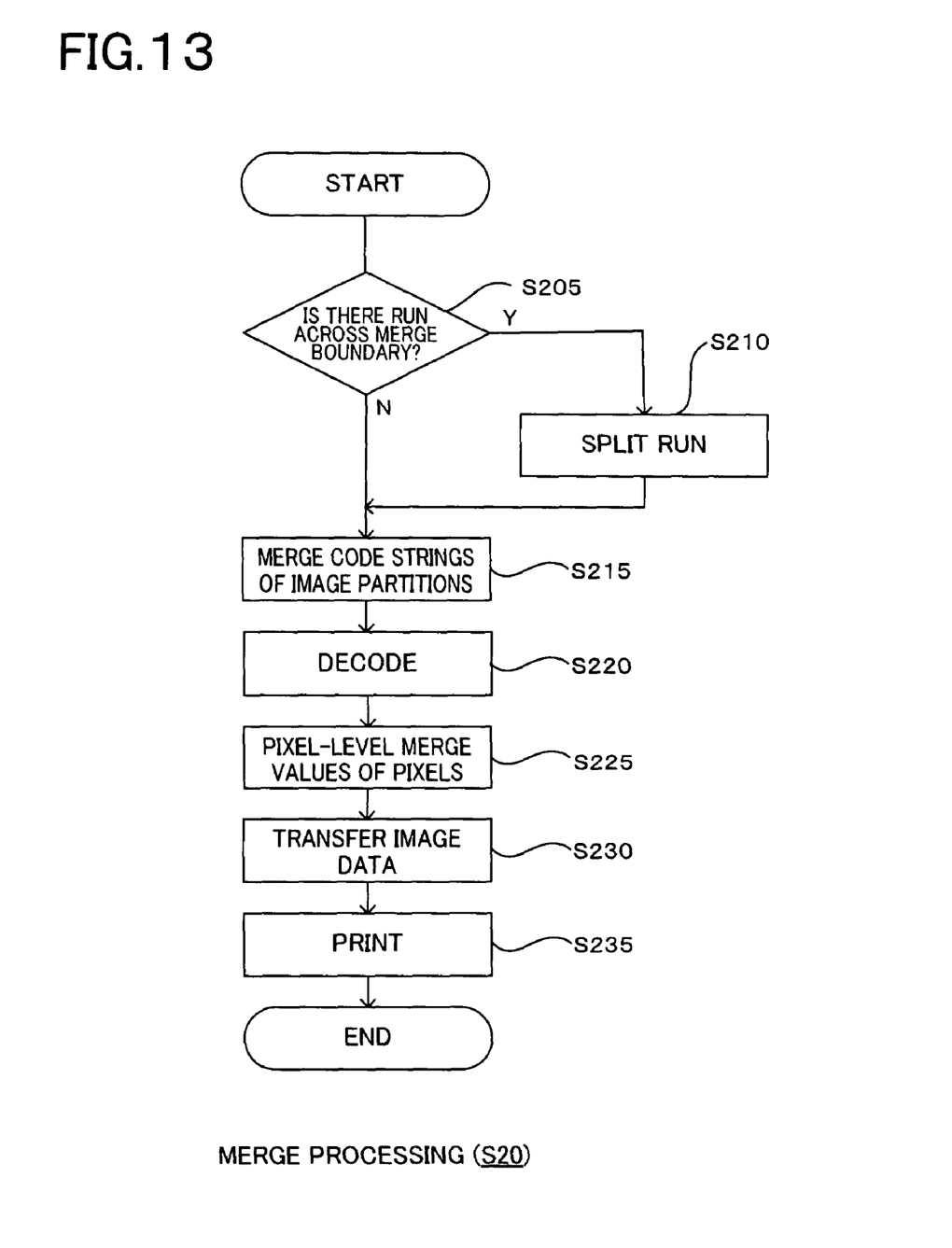
FIG. 13 is a flowchart of combine (merge) processing.

FIG. 13 is a flowchart of combine processing (S20).

Figure 12A:
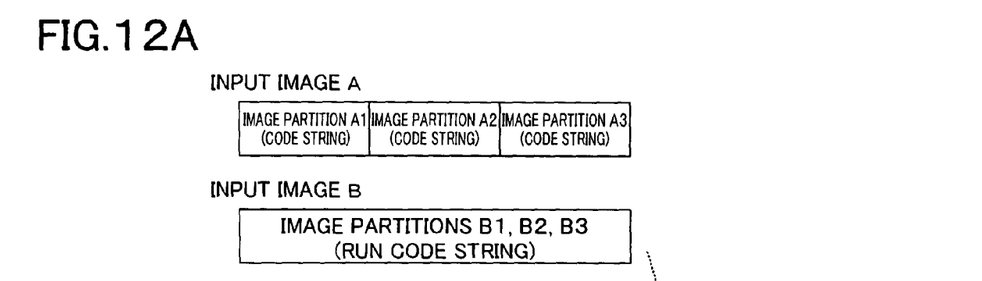
FIGS. 12A to 12E illustrate combine processing in greater detail.
Figure 12B:
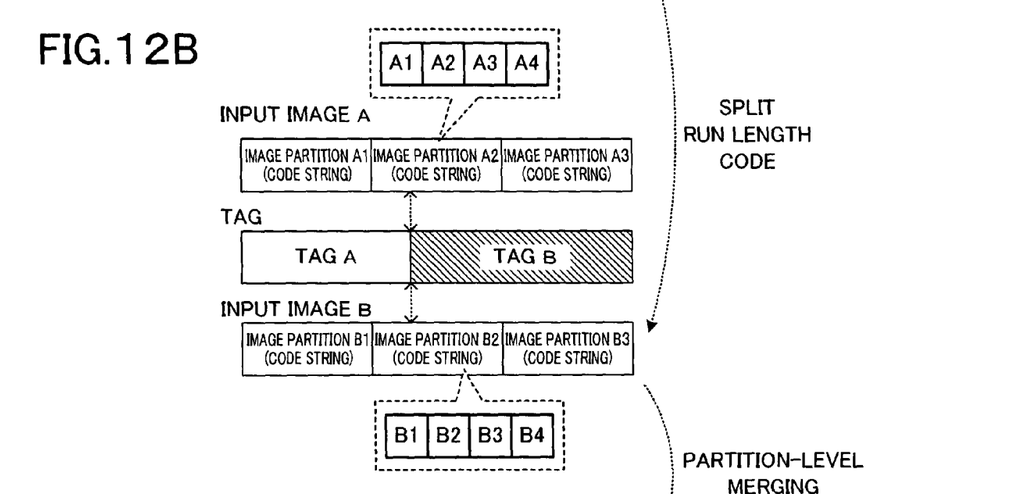

After determining a merge boundary based on tag information illustrated in FIG. 12B, the run splitting part 50 decides whether there is a run length code (representing plural image partitions) across the merge boundary at step 205 (S205) in FIG. 13. If there is a run length code across the merge boundary, the process goes to step S210; otherwise, the process goes to step S215.

When there is a run length code across the merge boundary, as illustrated in FIG. 12A, the run splitting part 50 splits the run length code as illustrated in FIG. 12B at step 210 (S210).

Tag information exists for each pixel. In this example, as illustrated in FIG. 12B, tag A to specify the input image A only exists with regard to an image region corresponding to image partition 1 (an image partition A1 and an image partition B1), both tag A to specify the input image A and tag B to specify the input image B exist with regard to an image region corresponding to image partition 2, and tag B to specify the input image B only exists with regard to an image region corresponding to image partition 3.

Figure 12C:
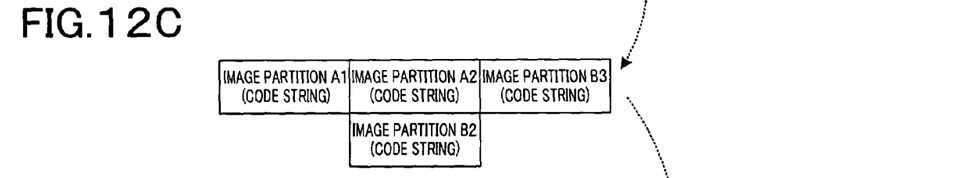

At step 215 (S215), the code editing part 52 performs partition-level merging as illustrated in FIG. 12C. That is, the code editing part 52 reads tag information per image partition; if all the tag information read indicates the input image A, it selects the code string corresponding to the image partition of the input image A (the code string of the image partition A1 in this example); if some indicates the input image A and some indicates the input image B in the tag information read, it selects the code strings belonging to both input images A and B (the code string of the image partition A2 and the code string of the image partition B2 in this example); and if all the tag information read indicates the input image B, it selects the code string belonging to the input image B (the code string of the image partition B3 in this example). The code editing part 52 may output two streams of the selected code strings to the decoding part 54 as illustrated in FIG. 12C; alternatively, it may merge these strings into one stream and output it to the decoding part 54.

Figure 12D:
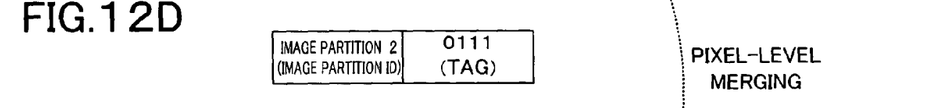

Only when some indicates the input image A and some indicates the input image B in the tag information read, the code editing part 52 in this example generates a pixel-level tag including information to identify the image partition (image partition ID) and tag information for the pixels in this image partition, as illustrated in FIG. 12D. The code editing part 52 may generate a pixel-level tag with regard to only an image partition requiring pixel-level merging as illustrated in FIG. 12D; alternatively, it may output all tag information that has initially been provided as pixel-level tags.

At step 220 (S220), the decoding part 54 sequentially decodes the code strings which are input in order from the code editing part 52 and outputs a set of decoded values of pixels to the pixel editing part 56.

At step 225 (S225), the pixel editing part 56 performs pixel-level merging of the values of pixels input from the decoding part 54. At step 230 (S230) and step 235 (S235), the image data then is transferred and printed.

Figure 12E:
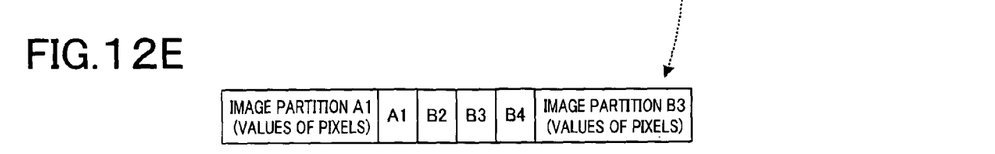

Specifically, the pixel editing part 56 determines the image partition in which the values of the pixels have to be merged, based on the pixel-level tag illustrated in FIG. 12D. For the pixels in that image partition, the pixel editing part 56 performs merging according to the tag and carries out the pixel-level merging as illustrated in FIG. 12E.

As explained above, combine (merge) processing is accomplished by combination of merge processing at the image partition level (processing on the codes) and merge processing at the pixel level (processing on the values of the pixels).

MODIFICATION EXAMPLE

Next, an example of modification to the previously described exemplary embodiment is described. While, in the described exemplary embodiment, the invention has been explained assuming that blocks (image partitions) each have 5×1 pixels or 4×1 pixels for explanatory convenience, blocks (image partitions) each having 32×1 pixels may be set up. That is, the block segmentation part 40 segments an image represented by input image information into blocks (image partitions) each having 32 pixels in the fast-scanning direction and one pixel in the slow-scanning direction. The modeling part 44 performs predictive coding, using start point information data (the last pixel value in the preceding block) and the values of the pixels in the target block, and calculates differences between each of the values of the pixels in the target block and the predictive value. For example, the modeling part 44 calculates prediction errors with respect to the last pixel value in the preceding block, assumed as the predictive value.

The encoding part 46 packs appeared prediction errors in a minimum number of bits for each half block (16×1 pixels). The minimum number of bits is calculated from a dynamic range of error values (a range within which the values of the pixels vary). The encoding part 46 also adds a one-byte header for designating bit pack length to the beginning of the packed data. For example, the header may be divided into two 4-bit fields for designating the bit pack length for each half block.

In the case where blocks each having 32×1 pixels are applied in this way, codes generated are always byte boundary and have a structure that is easy to handle.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image processing apparatus comprising:
   an image partitioning unit that partitions an image represented by input image information into image partitions, each containing a plurality of pixels;
   a run coding unit that run-length encodes image partitions for which all pixels contained in any of the image partitions match with a pixel value in a predetermined position in another image partition;

an independently coding unit that encodes image partitions other than image partitions encoded by the run coding unit, so that resulting codes are decoded independently for each image partition;

a code converting unit that converts a run length code generated by the run coding unit to codes that are decoded independently for each image partition, as appropriate for an image edit;

an image partition manipulating unit that manipulates codes resulting from conversion by the code converting unit or codes generated by the independently coding unit in units of the image partitions, as appropriate for the image edit;

a decoding unit that decodes image information manipulated by the image partition manipulating unit; and a pixel manipulating unit that manipulates the decoded image information by the decoding unit in units of pixels, as appropriate for the image edit, wherein if image partitions that are deleted by requested shift processing overlap some of the image partitions represented by a run length code, the code converting unit splits the run length code; the image partition manipulating unit shifts positions of encoded image information in units of the image partitions; and the pixel manipulating unit shifts decoded image information in units of pixels.

2. The image processing apparatus according to claim 1, wherein, if a single run length code corresponds to a plurality of image partitions and at least some of the image partitions are to be processed for the image edit, the code converting unit converts the run length code to run length codes corresponding to the image partitions respectively.

3. The image processing apparatus according to claim 2, wherein the code converting unit splits run length codes as appropriate for an angle of rotation of the input image;

the image partition manipulating unit reorders the image information in units of the image partitions in order according to an angle of rotation of the input image; and the pixel manipulating unit reorders values of the image information reordered by the image partition manipulating unit in order according to the angle of rotation of the input image.

4. The image processing apparatus according to claim 3, wherein the code converting unit splits a run length code corresponding to a plurality of serial image partitions in a fast-scanning direction, when the input image is rotated by 90 degrees; and the image partition manipulating unit reorders run length codes into which the run length code has been split by the code converting unit.

5. The image processing apparatus according to claim 3, wherein the code converting unit does not split a run length code corresponding to a plurality of serial image partitions in a fast-scanning direction, when the input image is rotated by 180 degrees;

the image partition manipulating unit reorders sequence of lines of image partitions in the fast-scanning direction only in a slow-scanning direction; and the pixel manipulating unit reorders sequence of values in the fast-scanning direction within an image partition on one line in the fast-scanning direction.

6. A non-transitory computer readable medium storing a program causing a computer to execute a process comprising:

partitioning an image represented by input image information into image partitions, each containing a plurality of pixels;

run-length encoding image partitions for which all pixels contained in any of the image partitions match with a pixel value in a predetermined position in another image partition;

encoding image partitions other than image partitions encoded by the run length encoding, so that resulting codes are decoded independently for each image partition;

converting a run length code, generated by the run-length encoding image partitions step, to codes that are decoded independently for each image partition, as appropriate for an image edit;

manipulating codes resulting from the converting or codes generated by the encoding image partitions other than image partitions encoded by the run length encoding step in units of the image partitions, as appropriate for the image edit;

decoding image information manipulated by the manipulating codes step; and manipulating the decoded image information in units of pixels, as appropriate for the image edit, wherein if image partitions that are deleted by requested shift processing overlap some of the image partitions represented by a run length code, the converting step splits the run length code; the manipulating codes step shifts positions of encoded image information in units of the image partitions; and the manipulating the decoded image information step shifts decoded image information in units of pixels.

7. An image processing method comprising:

partitioning an image represented by input image information into image partitions, each containing a plurality of pixels;

run-length encoding image partitions for which all pixels contained in any of the image partitions match with a pixel value in a predetermined position in another image partition;

encoding image partitions other than image partitions encoded by the run length encoding, so that resulting codes are decoded independently for each image partition;

converting a run length code, generated by the run-length encoding image partitions step, to codes that are decoded independently for each image partition, as appropriate for an image edit;

manipulating codes resulting from the converting or codes generated by the encoding image partitions other than image partitions encoded by the run length encoding step in units of the image partitions, as appropriate for the image edit;

decoding image information manipulated by the manipulating codes step; and manipulating the decoded image information in units of pixels, as appropriate for the image edit, wherein if image partitions that are deleted by requested shift processing overlap some of the image partitions represented by a run length code, the converting step splits the run length code; the manipulating codes step shifts positions of encoded image information in units of the image partitions; and the manipulating the decoded image information step shifts decoded image information in units of pixels.

* * * * *